(No Model.)

J. M. GASTON.
SHIELD FOR PNEUMATIC TIRES.

No. 551,953. Patented Dec. 24, 1895.

Witnesses:
Jas. E. Hutchinson
Henry C. Hazard

Inventor:
James M. Gaston, by
Prindle and Russell, his Attys

UNITED STATES PATENT OFFICE.

JAMES MONROE GASTON, OF LOUISVILLE, KENTUCKY.

SHIELD FOR PNEUMATIC TIRES.

SPECIFICATION forming part of Letters Patent No. 551,953, dated December 24, 1895.

Application filed November 15, 1894. Serial No. 528,919. (No model.)

*To all whom it may concern:*

Be it known that I, JAMES MONROE GASTON, a citizen of the United States, residing at Louisville, in the county of Jefferson, and in the State of Kentucky, have invented certain new and useful Improvements in Shields or Protectors for Pneumatic Tires; and I do hereby declare that the following is a full, clear, and exact description thereof, reference being had to the accompanying drawings, in which—

Figure 1:
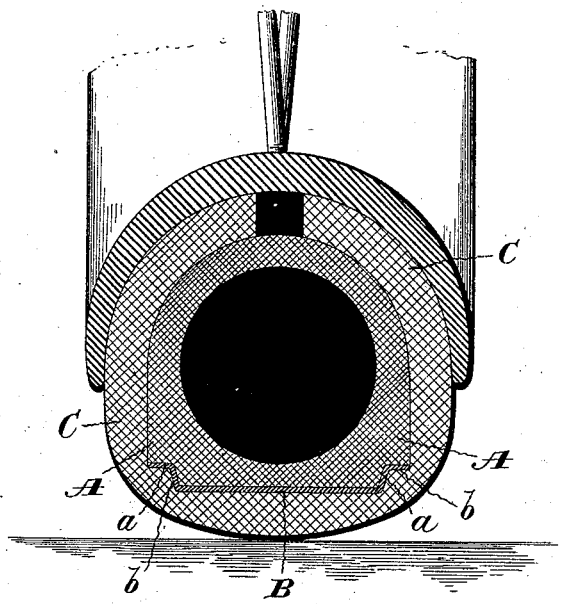
Figure 2:
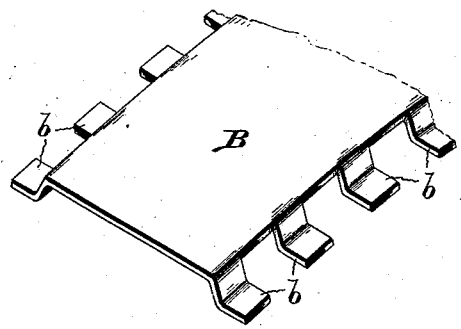
Figure 3:
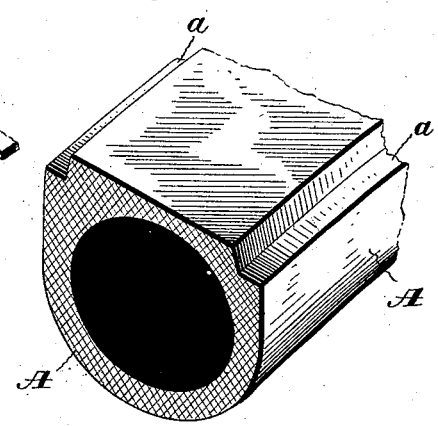

Figure 1 is a cross-section of a pneumatic tire embodying my invention; Fig. 2, a perspective view of a portion of the shield or protector for the inner tube, and Fig. 3 a like view of a portion of the inner tube.

Letters of like name and kind refer to like parts in each of the figures.

The design of my invention is the provision of a shield or protector for pneumatic tires that will perfectly guard the inner tube from puncture, in no degree diminish the air capacity thereof, nor impair the elasticity of the tire, and be easy and cheap of construction and application to the tire; and to these ends my invention consists in the construction and combination of parts, substantially as and for the purpose hereinafter specified.

In the carrying of my invention into practice, I employ an inner or air tube A, whose interior in cross-section is perfectly circular or round, and a portion of whose exterior transversely is made flat and provided at each side with a depression $a$, that, together with said flat portion, extends entirely around the tube circumferentially. The portion of the tube thus shaped is upon that side which is exposed to injury, and the part between the depressions $a$ and $a$ has a width equal to or somewhat greater than the internal diameter of the tube. Upon and covering said flat part is placed the shield or protector B, which consists of a thin continuous strip of metal that extends entirely around the tire and in cross-section is flat, and is of a width corresponding to that of the flat raised part of the tube, and hence greater than the internal diameter of the latter. The protector will thus prevent any possibility of a puncture or cut extending into the interior of the tube. Said protector is firmly held against lateral movement by means of a series of separated fingers $b$ and $b$ upon each side of the plate that are bent inward and then horizontally outward to fit and conform to the depressions $a$ and $a$. The customary outer tube C is employed, and interiorly it is flattened and shouldered to conform to and engage the flat protector covered and depressed portions of the inner tube, as clearly shown in Fig. 1.

I preferably employ spring-brass as the material from which to make my protector B, because of its non-corrodibility, and as not only not impairing the elasticity of the tire, but, by reason of its resiliency, rather contributing to such elasticity.

Owing to its flat shape in cross-section my protector readily adapts itself or responds to pressure without itself being subjected to undue strain or imposing undue and unequal strain upon the tire. Lateral or sidewise movement, to the injury of the tubes, is impossible by reason of the fingers $b$ and $b$, and the horizontal extensions of the latter prevent the same from cutting into the inner tube.

The series of separated fingers is a preferred though not the only construction for holding the protector in place, since such construction in no degree impairs the elasticity of the protector and diminishes the weight thereof.

It will be observed that the flattening of the inner tube is entirely external, and hence there is no reduction of the air capacity of said tube.

While preferring the embodiment of my invention as herein described, it is to be understood that I do not limit the scope of my invention to such specific construction, and I deem myself entitled to employ such features of my invention as are applicable thereto to pneumatic tires in which no outer tube is used, and where it will be necessary to embed or mold the shield within the wall of the air-tube.

Having thus described my invention, what I claim is—

1. The combination, of an air tube having a flat periphery and an annular depression at each side of the flat portion, and a shield fitting the latter and having projections that engage the annular depressions, substantially as and for the purpose specified.

2. The combination of an air tube having a flat periphery and a depression at each side of the flat portion, a shield consisting of a continuous strip conforming to the flat periphery and having projections that engage the depressions, substantially as and for the purpose shown.

3. The combination of an air tube having a flat periphery and an annular depression at each side of the latter, a shield fitting the flat periphery and having projections that engage the annular depressions, and an outer tube conforming interiorly to the shape of the air tube and shield, substantially as and for the purpose described.

4. The combination of an air tube and a shield therefor having inwardly and horizontally projecting portions upon opposite sides, substantially as and for the purpose set forth.

5. The combination of an air tube, a shield therefor having at each side a series of fingers that consist each of inward and horizontally extending portions, substantially as and for the purpose specified.

In testimony that I claim the foregoing I have hereunto set my hand this 10th day of October, 1894.

JAMES MONROE GASTON.

Witnesses:
ANNA M. RICHARDS,
EVAN B. STOTSENBURY.